Oct. 24, 1939.　　　I. HARTER　　　2,177,127
METHOD OF MAKING A PIPE SECTION
Filed May 23, 1936
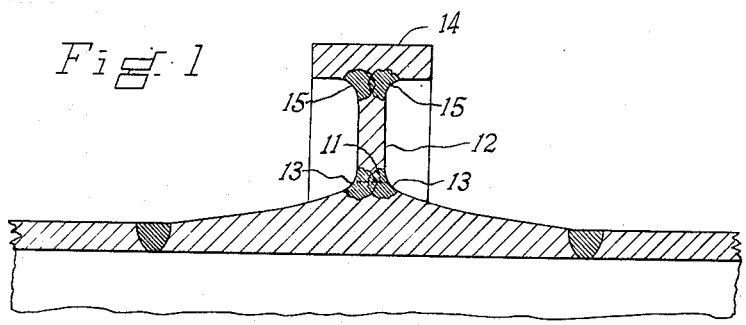
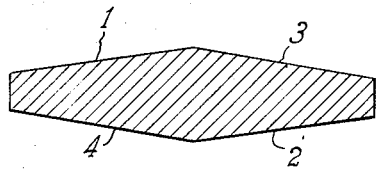
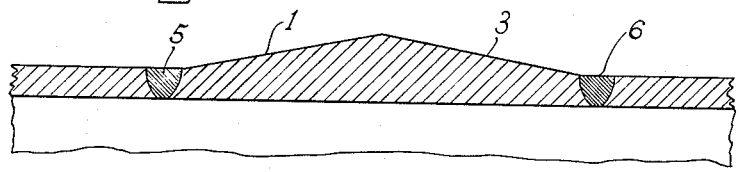
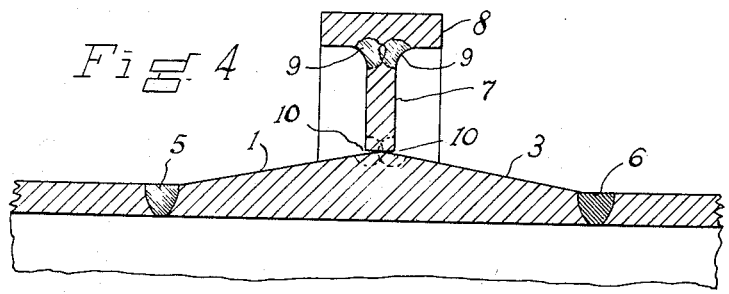
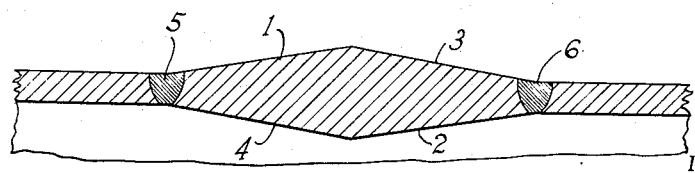
INVENTOR.
Isaac Harter
BY
ATTORNEY.

Patented Oct. 24, 1939

2,177,127

UNITED STATES PATENT OFFICE 2,177,127

METHOD OF MAKING A PIPE SECTION

Isaac Harter, New York, N. Y., assignor to The Babcock & Wilcox Company, Newark, N. J., a corporation of New Jersey Application May 23, 1936, Serial No. 81,353

5 Claims. (Cl. 29—156)

This invention has reference to supporting, stiffening and sustaining conduits or penstocks of large diameter and heavy static loading.

In conduits or penstocks of such diameter as, for instance, 30 feet, and of the type installed at the Boulder Canyon Project, United States Department of the Interior, Bureau of Reclamation, the conduit or penstock is built up of contiguous sections of cylindrical form, each section being 24 feet long with a wall thickness of approximately 3 inch steel, the total 24 foot section weighing approximately 300,000 pounds and subjected to internal fluid pressure of over 300 pounds, and which, when filled with liquid, has its static loading increased by the weight of the liquid.

In connection with such conduits or penstocks as are above mentioned it will be appreciated that the line or plane localization of any stresses resulting from internal pressure, beam effect, or tendency of the conduit to become oval in shape, afford a location or locations at which the factor of safety must be far in excess of that which is required at other locations in the conduit.

One solution of the problem of providing proper stiffening, supporting and sustaining is set forth in United States Patent 1,979,424, dated November 6, 1934, issued to James E. Trainer and Charles M. Day, and wherein there is shown a construction which provides a supporting, sustaining and stiffening means so related with respect to the conduit that instead of line or plane localization of such stresses there is an appreciable unit of area over which the same are distributed as compared with simply circumscribing the conduit or penstock with a reinforcing band.

An object of the invention disclosed in the aforesaid patent is to distribute the fixed stresses in such manner as to eliminate localization of the same, and more particularly to produce a transition zone of gradually increasing thickness from minimum to maximum without incorporating any abrupt change in wall thickness which would have the undesirable effect of inherently localizing the stress effects without provision for distribution over an appreciable unit area.

Additionally, the invention, in the patent named, contemplates a composite conduit of joined cylindrical sections, preferably welded, forming an integral whole in such a manner that there are interposed at intervals throughout the whole, and at locations best adapted for supporting, sustaining and stiffening the whole, sections which vary in wall thickness with respect to the major portion of the conduit and produce a gradual zone of transition from minimum to maximum wall thickness circumferentially, or from minimum to maximum to minimum. However, the aforesaid patented invention, as described, contemplates the fabrication of a special conduit unit for stiffening, supporting and sustaining, such being formed by rolling and joining into ring shape a length of raw stock which is of unusual and irregular cross section and which, by reason of such cross-sectional shape, is required to be specially fabricated at the steel mill at considerable extra expense over the expense of a shape which may be rolled on usual commercial equipment.

With the foregoing as a premise the present invention has for one of its objects the provision of a supporting, stiffening and sustaining means for conduits or penstocks of large diameter wherein the inserted cylindrical section has all of the advantages of the previously patented conduit section but, in addition, is formed from a piece, the cross-sectional shape of which is easily and inexpensively provided by the steel mill and hence materially reduces the ultimate cost but without sacrificing any of the features.

Another object is to provide a ring-form supporting, stiffening and sustaining means from a flat rolled shape of polygonal cross section and whose dimension transversely of its width is maximum at an intermediate location.

A further object is to provide a ring-shape supporting, stiffening and sustaining means from flat rolled stock of irregular polygonal cross section and having adjacent surfaces forming a peak extending longitudinally of the stock intermediate its width, but which in its ultimate form has a cylindrical interior surface of but one diameter.

In the accompanying drawing there is illustrated, semi-diagrammatically, a method and means of carrying the present invention into practice, reference being had to the previously granted Patent 1,979,424, where the method of incorporating the present invention into the finished pipe or conduit is disclosed.

In the drawing—

Fig. 1 is an enlarged sectional view of the manner in which the supporting, stiffening and sustaining means of the prior Patent 1,979,424 and of this invention is incorporated in a conduit or penstock to form a part of the wall thereof;

Fig. 2 is an end elevation in section of the flat strip stock from which the supporting, stiffening and sustaining means of the present invention is formed;

Fig. 3 is a view similar to Fig. 1 showing the final shape, in cross section, of a rolled ring shape of a sustaining and supporting member as made from the strip stock of Fig. 2, and as incorporated in the wall of a conduit or penstock;

Fig. 4 is a view similar to Fig. 3 but with an added band of T-form in cross section incorporated in the means of Fig. 3 though it more nearly resembles the form shown in Fig. 1; and Fig. 5 is a view similar to Fig. 3 but with the strip stock incorporated in the conduit in the starting cross-sectional shape, and to which, if desired, the flange of Figs. 1 and 4 may also be applied.

In detail—

The starting shape is a flat strip which may be of substantially diamond form in cross section as shown, the four surfaces thereof being represented by the numbers 1, 2, 3 and 4, surfaces 1 and 3 being on the same side of a median plane through the section, and surfaces 2 and 4 on the opposite side.

Such a section of bar stock of the proper length and thickness dimension for a rolled conduit or ring section may be rolled in proper length or cut from a long strip and then rolled into ring form, the ends being welded together to complete the ring. Such a ring, shown in Fig. 5, is then incorporated into the conduit by welding, as indicated at 5 and 6, in the same manner as is described for the section referred to in the aforesaid Patent 1,979,424, the rolled section having its end edges of thickness equivalent to the thickness of the wall of the conduit with which it is joined so that in incorporating the supporting, stiffening and sustaining member the edges to be welded together have the same characteristics from the thermal standpoint.

If the restriction which is occasioned by the incorporation of the piece in the polygonal form of cross section described proves to be objectionable in any particular installation, the strip piece, in rolling to ring form, may be deformed so, for instance that the two surfaces 2 and 4 are brought into the same plane as indicated by the sectional form shown in Figs. 1, 3 and 4, while the edges which are to be joined with the conduit are left of the same thickness as the walls of the conduit with which such edges are to be joined.

If desirable such form of insert as is shown in Figs. 1, 3 and 4 may, like the form shown in Patent 1,979,424, be provided with a central circumscribing flange 7 to which there is applied at the exterior a circumscribing band 8, the flange and band being welded to each other as indicated at 9 and to the insert as indicated at 10, while the insert is welded into the conduit or penstock as at 5 and 6 in the same manner as indicated in connection with Fig. 5.

While in Fig. 4 the flange 7 is welded to the insert without deformation of the peak of the two surfaces 1 and 3 as shown in dotted lines, if desirable, in rolling the section to ring form, the peak between the surfaces 1 and 3 may be reduced to a flat surface by the same operation, such flat surface being indicated in dotted line in Fig. 1 as at 11, and to which there is then applied the flange 12 normal to the axis and welded as at 13 to the insert and having the circumscribing band 14 welded to the flange at 15; or, if preferred, the circumscribing flange 7 may be double beveled on the inside edge to form a V-groove for receiving the weld deposited metal.

From the foregoing it will be obvious that the invention is equally applicable as a stiffening or supporting means for large tanks where there are bending stresses, internal stresses, or both.

While in the foregoing I have described a specific embodiment of stiffener ring it will, nevertheless, be clear that departure therefrom may be made without avoiding the intent and scope of the appended claims defining the invention.

I claim:

1. The method of forming a reenforcing insert for joining cylindrical parts which comprises rolling a strip to polygonal form in cross section, then forming the strip into a ring while displacing adjacent surfaces of the polygon into alignment on the inside of the ring, and then welding the ring closed.

2. The method of forming a reenforcing insert for joining cylindrical parts which comprises rolling a strip to polygonal form in cross section, then forming the strip into a ring while displacing adjacent surfaces of the polygon into alignment on the inside of the ring, welding the ring closed, and then circumscribing the ring with a flange at its mid-section.

3. The method of forming a reenforcing insert for joining cylindrical parts which comprises rolling a strip to polygonal form in cross section, then forming the strip into a ring while displacing adjacent surfaces of the polygon into alignment on the inside of the ring, welding the ring closed, reducing the peak between the remaining surfaces to form a flat foundation, and then circumscribing the ring with a flange around said foundation.

4. The method of forming an annular metallic reinforcing member which comprises bending into a ring a rolled metallic strip of polygonal cross section having peaks longitudinally of the strip between adjacent surfaces at opposite sides so that the peaks are disposed interiorly and exteriorly during bending, displacing adjacent surfaces to reduce one of said peaks subsequent to initiation of the bending operation, and joining the ends of the bent strip to close the ring.

5. The method of forming an annular metallic reinforcing member which comprises bending into a ring a rolled metallic strip of polygonal cross section having peaks between adjacent surfaces at opposite sides of the strip so that the peaks are disposed interiorly and exteriorly during bending, displacing adjacent surfaces into alignment to eliminate the peak interiorly disposed subsequent to initiation of the bending operation, and joining the ends of the bent strip to close the ring.

ISAAC HARTER.